United States Patent
Aziz

(10) Patent No.: US 7,231,001 B2
(45) Date of Patent: Jun. 12, 2007

(54) PROCESSING SERVO DATA HAVING DC LEVEL SHIFTS

(75) Inventor: Pervez M. Aziz, Garland, TX (US)

(73) Assignee: Agere Systems Inc., Allentown, PA (US)

(*) Notice: Subject to any disclaimer, the term of this patent is extended or adjusted under 35 U.S.C. 154(b) by 735 days.

(21) Appl. No.: 10/436,527

(22) Filed: May 13, 2003

(65) Prior Publication Data

US 2004/0190646 A1 Sep. 30, 2004

Related U.S. Application Data

(60) Provisional application No. 60/457,041, filed on Mar. 24, 2003.

(51) Int. Cl.
*H04L 25/10* (2006.01)
*H03L 5/00* (2006.01)
(52) U.S. Cl. .................. 375/319; 375/316; 327/307
(58) Field of Classification Search ................ 375/319, 375/316, 317; 327/307, 99, 141, 165
See application file for complete search history.

(56) References Cited

U.S. PATENT DOCUMENTS 6,242,961 B1* 6/2001 Liu et al. ..................... 327/307
2002/0101671 A1* 8/2002 Uno et al. ..................... 360/39

* cited by examiner

Primary Examiner—Khai Tran

(57) ABSTRACT

A read channel component of a magnetic recording system employs equalization of a signal received from the magnetic recording channel, the equalization being modified depending upon the presence or absence of DC shifts in the signal. Equalization corrects for DC shifts, if present, prior to detection and decoding of servo data, such as servo address mark (SAM) and Gray code data. In a first implementation, a DC shift detector detects the presence or absence of DC shifts and modifies equalization in a predetermined manner. In a second implementation, filtering is applied to the signal to enhance equalization in the presence of DC shift, and both filtered and unfiltered signals employed for detection of the servo data.

25 Claims, 5 Drawing Sheets

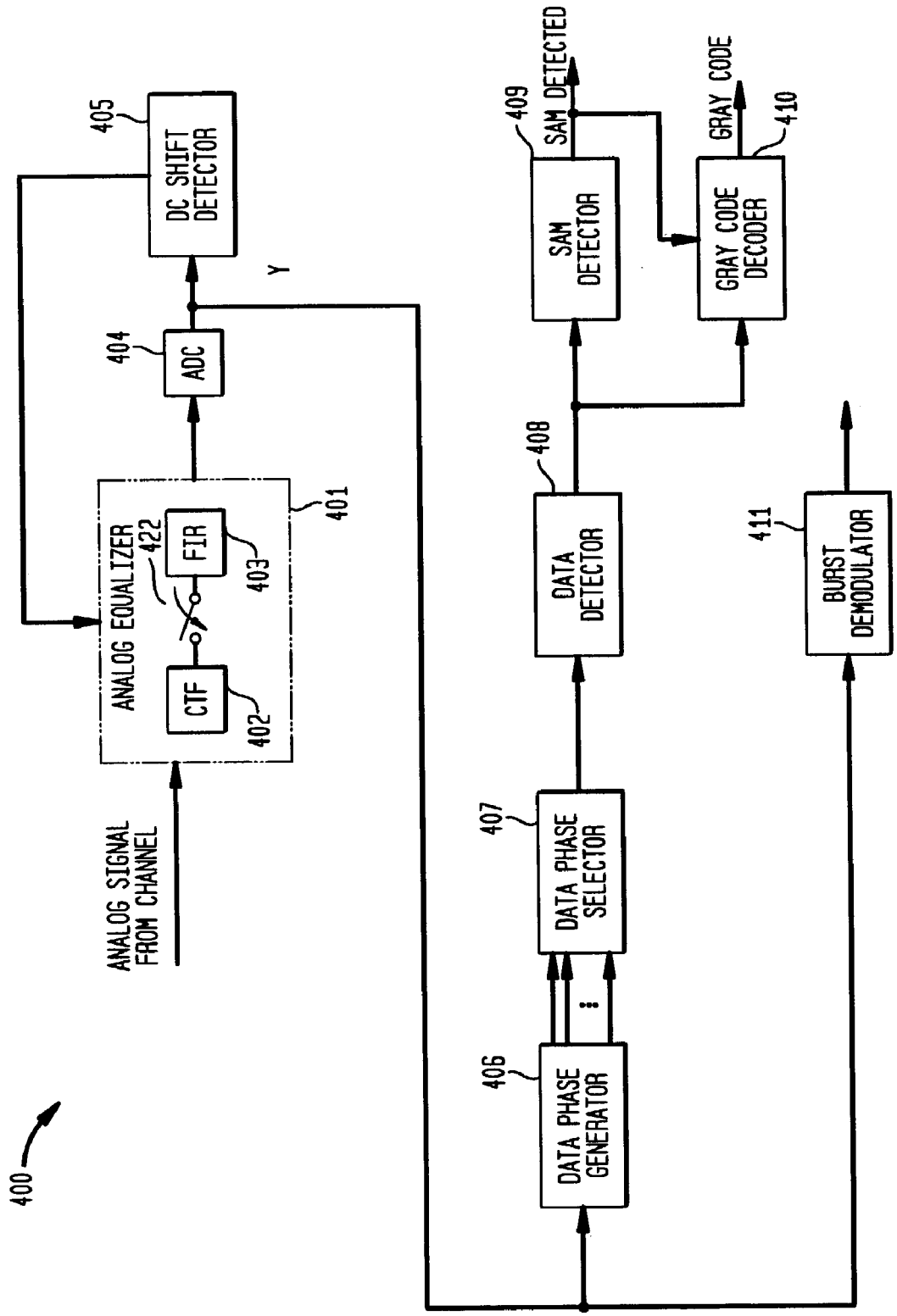

PROCESSING SERVO DATA HAVING DC LEVEL SHIFTS

CROSS REFERENCE TO RELATED APPLICATIONS

This application claims the benefit of the filing date of U.S. provisional application No. 60/457,041, filed on Mar. 24, 2003.

BACKGROUND OF THE INVENTION

1. Field of the Invention

The present invention relates to detection of data in a communications system, and, more particularly, to processing of servo data information read from a channel.

2. Description of the Related Art

A read channel integrated circuit (IC) is a component of a modern disk drive, such as a hard disk drive found in many PCs. A read channel component converts and encodes data to enable the (e.g., magnetic) recording head(s) to write data to the disk and then read back the data accurately. The disks in a hard disk drive typically include many tracks containing encoded data, and each track comprises one or more of user (or "read") data sectors as well as "servo" data sectors embedded between the read sectors. The information of the servo sectors aids in positioning the magnetic recording head over a track on the disk so that the information stored in the read sectors may be retrieved accurately.

FIG. 1 shows a conventional magnetic recording system 100 of the prior art. Servo information is encoded by block encoder 101, and block encoder 101 may represent one or more different encoders associated with different fields of the servo information, such as Gray code and servo address mark (SAM) data. The encoded servo information is written to the disk (or other recording medium) as servo sector information.

FIG. 2 shows the format of servo sector information 200. Servo sector information 200 comprises preamble 201 (e.g., a 2T pattern) that allows the system to recover the timing and gain of the written servo data. Preamble 201 may be followed by encoded SAM data 202, which is generally an identical identification address (fixed number of bits) for all servo sectors. SAM data 202 may then be followed by Gray data 203 (i.e., encoded Gray code). Gray data 203 represents track number/cylinder information and may be employed as coarse positioning information for the magnetic head. One or more burst demodulation fields 204 follow Gray data 203. Burst demodulation fields 204 are employed as fine positioning information for the head over the track. Repeatable-run-out (RRO) data field 205 follows burst demodulation fields 204. RRO data in RRO data field 205 provides head-positioning information to correct for RRO, which occurs when the head does not track an ideal path over the disk. RRO information is finer than that provided by the Gray data and coarser than that provided by the burst demodulation fields.

Returning to FIG. 1, the encoded servo information is read back by a magnetic recording head. Together, the process of writing to, storing on, and reading from the disk by the recording head may be modeled as magnetic recording channel 102 with added noise and DC shifts. Data read from the disk is referred to as readback data. The readback data is equalized to a desired target partial response by equalizer 103. Equalizer 103 comprises continuous time filter (CTF) 120 followed by discrete time, finite impulse response (FIR) filter 121. Sampling of the signal from CTF 120 might be accomplished via switch 122. Sampling might be synchronous using the timing information from digital phase locked loop (DPLL) 123 when servo SAM, Gray, and demodulation burst data are read, but might also be asynchronous if DPLL 123 is not used. Sampling of the signal from CTF 120 might be asynchronous when RRO data is read. The output of equalizer 103 is digitized and quantized by analog-to-digital converter (ADC) 104, whose output is shown as Y values.

For either synchronous and asynchronous sampling, the Y values might be applied to data detector 105, which is typically a partial-response maximum-likelihood (PRML) detector employing, for example, a Viterbi algorithm. Detector 105 may also be implemented with a slicer. Constraints imposed by the servo-encoding algorithm of block encoder 101 might be employed in the design of data detector 105 for optimal decoding of the encoded servo information. The output of data detector 105 is applied to SAM detector 107 to detect the SAM data. The output of data detector 105 and the output of SAM detector 107 are applied to Gray code decoder 108 to generate decoded Gray data. The 'Y' values are also applied to burst demodulator 111 to generate fine positioning information for the head over the track.

For asynchronous sampling, such as when DPLL 123 is not used or when reading RRO data, data phase generator 109 and data phase selector 110 might be employed. Data phase generator 109 generates one or more additional sample sequences from the Y values, each additional sample sequence having a different phase relative to the phase of asynchronous samples from ADC 104. The one or more additional sample sequences might be generated either by asynchronous over-sampling or by interpolation of the asynchronous samples from ADC 104. The one or more additional sample sequences and the asynchronous samples from ADC 104 are provided to data phase selector 110. Data phase selector 10 selects of the input sequences for use by data detector 105 based on a determination of which sequence phase is closest to those having ideal timing.

In addition to noise, DC (baseline level) shifts might impair the signal of recording channel 102. Performance of magnetic recording system 100, as measured by SAM detection error rate and Gray code detection error rate, might be degraded considerably when large amplitude DC shifts corrupt the encoded servo information signal. These DC shifts might occur when the read head becomes unstable. FIG. 3A shows a graph of waveforms with DC baseline shift (shown as dashed lines) and without DC baseline shift (shown as solid lines) before sampling, and FIG. 3B shows a graph of waveforms with and without DC baseline shift after equalization and sampling (circles are sample points). Shown in FIGS. 3A and 3B are the input servo signal as well as one phase of the servo signal at the output of ADC 104 before data detection, respectively.

Data detector 105 might detect positive and negative peaks in the servo signal, but DC shifts in the servo signal cause severe signal discontinuities. DC shifts might occur i) randomly within the servo signal, ii) with random duration, and iii) multiple times. Consequently, DC shifts of magnetic recording system 100 are different from a fixed DC offset applied to the entire servo signal or a fixed offset applied to the signal corresponding to individual servo-encoded words. Depending on where the DC shifts occur in the signal, the DC shift might lead to a severe reduction in amplitude of the peaks in the signal, preventing reliable data detection regardless of the type of data detection employed by system 100. For example, in FIGS. 3A and 3B, the amplitude of the negative peak around time 1025 is severely degraded. Less reliable data detection results in an increase in the SAM detection and Gray bit error rates, which inhibits proper operation of the servo system and, in particular, the throughput of the servo system.

SUMMARY OF THE INVENTION

The present invention relates to equalization of a signal received from a channel in which the equalization is modified depending upon the presence or absence of DC shifts in the signal prior to detection of, for example, servo data. In one case, the presence or absence of DC shifts is detected and equalization is modified in a predetermined manner. In another case, filtering is applied to the signal to enhance equalization in the presence of DC shift, and both filtered and unfiltered signals are employed for detection of the servo data.

In accordance with exemplary embodiments of the present invention, data in a signal read from a channel is detected by applying, with an equalizer, equalization to the signal to account for a DC shift in the signal; and detecting the data based on either the presence or absence of the DC shift in the signal.

BRIEF DESCRIPTION OF THE DRAWINGS

Other aspects, features, and advantages of the present invention will become more fully apparent from the following detailed description, the appended claims, and the accompanying drawings in which:

FIG. 4 shows a receiver for detecting and decoding data accounting for DC shift in accordance with a first exemplary embodiment of the present invention;

DETAILED DESCRIPTION

Figure 1:
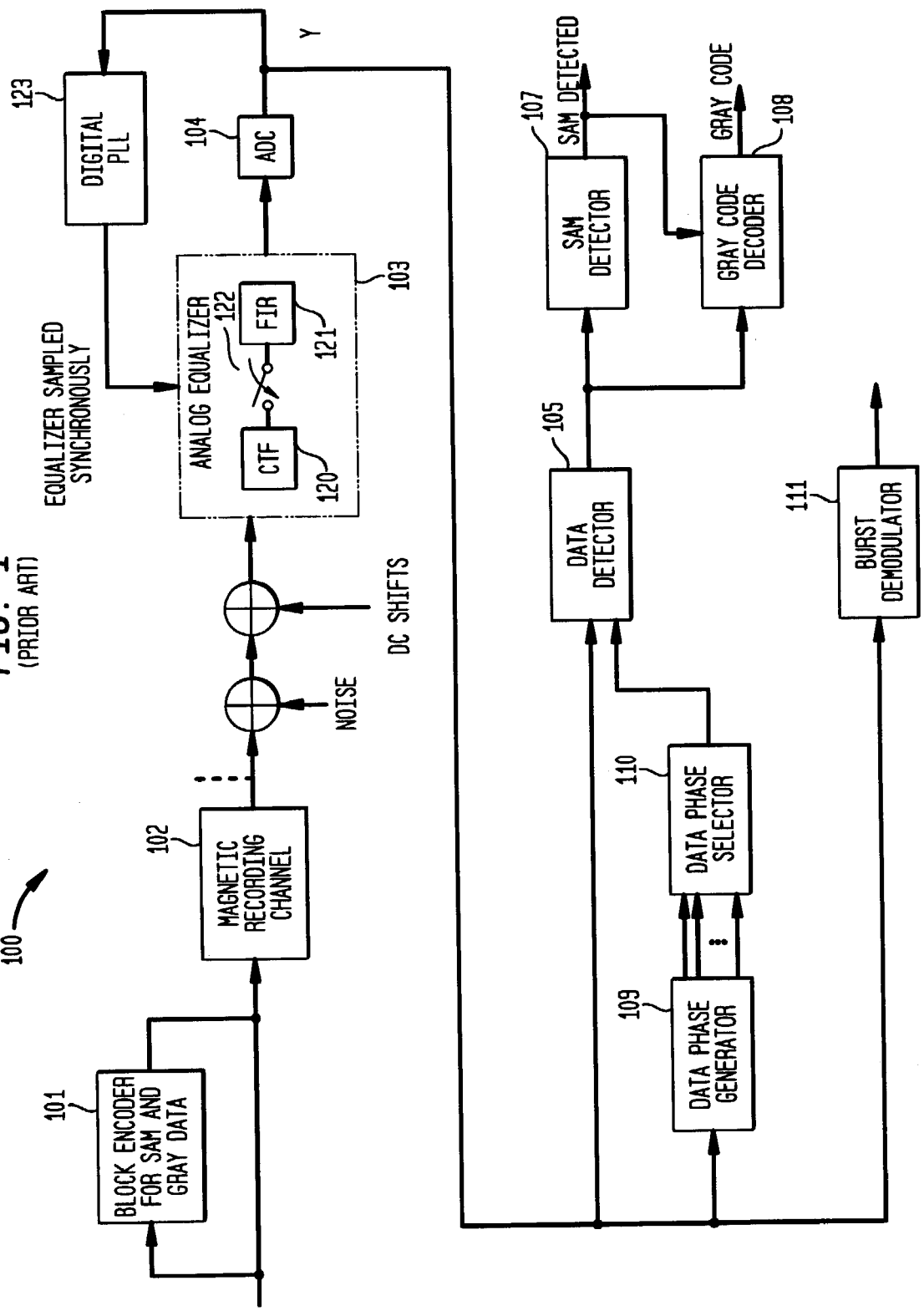
FIG. 1 shows a conventional magnetic recording system of the prior art.
Figure 2:
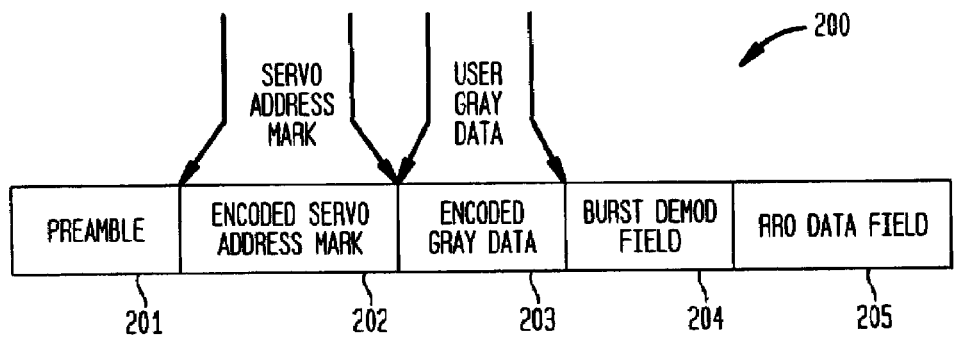
FIG. 2 shows a format for servo sector information employed with the magnetic recording system of FIG. 2.
Figure 3A:
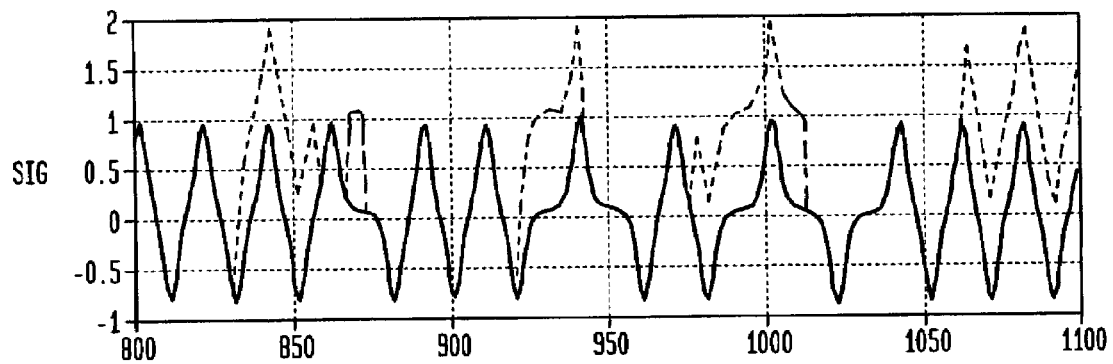
FIG. 3A shows a graph of waveforms with and without DC baseline shift.
Figure 3B:
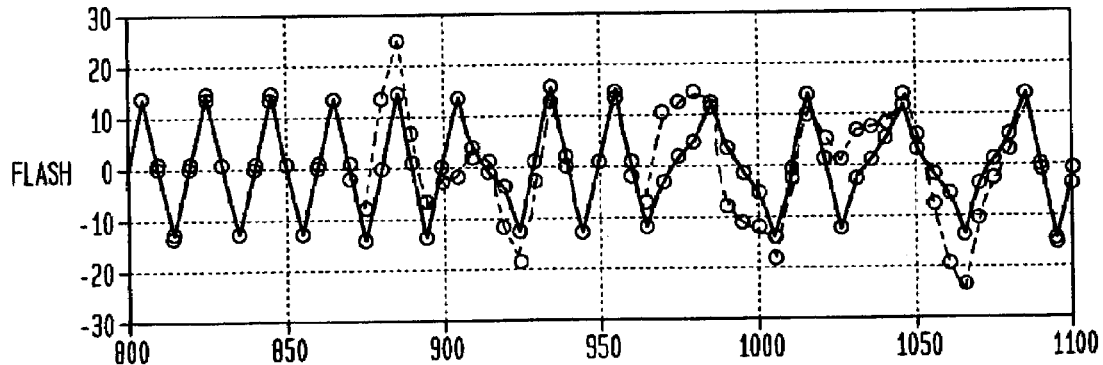
FIG. 3B shows a graph of waveforms with and without DC baseline shift after sampling.

In accordance with exemplary embodiments of the present invention, equalization of a signal received from a channel is modified depending upon the presence or absence of DC shifts in the signal prior to detection and decoding of, for example, servo data. Equalization might be modified by first detecting DC shifts, or filtering of the signal may be employed to enhance equalization in the presence of DC shifts. When filtering is employed, both filtered and unfiltered signals might be employed for detection and decoding of the servo data.

FIG. 4 shows a receiver 400 for detecting and decoding servo data accounting for DC shifts in accordance with a first exemplary embodiment of the present invention. Receiver 400 comprises equalizer 401 having continuous time filter (CTF) 402 and finite impulse response filter 403, analog-to-digital converter (ADC) 404, and DC shift detector 405. Receiver 400 further comprises burst demodulator 411, data phase generator 406, data phase selector 407, data detector 408, servo address mark (SAM) detector 409, and Gray code decoder 410.

Receiver 400 receives an analog signal read from, for example, a magnetic recording channel. The analog signal may represent encoded servo information, such as encoded Gray and SAM data read from a disk (or other recording medium) as servo sector information. The analog signal is equalized to a desired target partial channel response, such as an EPR4 ([5 5 −5 −5]) response. Equalization by equalizer 401 tends to correct for effects of inter-symbol interference resulting from the signal passing through the magnetic recording channel. FIR filter 403 may be characterized by a set of filter tap coefficients. Methods for determining both analog filter circuit components for CTF 402 and filter taps for FIR filter 403 to equalize the input signal are well known in the art. In addition, equalizer 401 may correct for DC shifts in the input signal.

Sampling of the signal from CTF 402, shown in FIG. 4 by switch 422, is asynchronous and the output of equalizer 401 is digitized and quantized by ADC 404, whose output is an asynchronous sample sequence shown as 'Y' values. The asynchronous sample sequence from ADC 404 is applied to DC shift detector 405. DC shift detector 405 detects DC shifts in the sampled, equalized signal from the recording channel. DC shift detector 405 may be implemented by, for example, a threshold or similar level detector. As described subsequently, when a DC shift is detected, DC shift detector 405 provides a signal to equalizer 401 to modify operation of equalizer 401 to correct for the detected DC shift.

The asynchronous sample sequence is applied to data phase generator 406. Data phase generator 406 generates one or more additional sample sequences from the Y values, each sample sequence having a phase relative to the asynchronous samples from ADC 404. The one or more additional sample sequences might be generated either by asynchronous over-sampling or by interpolation of the asynchronous samples from ADC 404. The one or more additional sample sequences of data phase generator 406 and the asynchronous samples from ADC 404 are provided to data phase selector 407. Data phase selector 407 selects one (or possibly two) of the input sequences for use by data detector 408 based on a determination of which sequence phase is closest to the ideal sample sequence. The initial data phase is typically determined during a preamble or 2T pattern within the encoded servo data, and then continually updated thereafter.

The sample sequence selected by data phase selector 407 is applied to data detector 408, which is typically a partial-response maximum-likelihood (PRML) detector employing, for example, a version of the well-known Viterbi algorithm. Data detector 408 might also be implemented as a slicer. Constraints imposed by the algorithm employed to encode the servo data might be employed in the design of data detector 408 for optimal decoding of the encoded servo information. The output of data detector 408 is applied to SAM detector 409 to detect the SAM data. The output of data detector 408 and the output of SAM detector 409 are applied to Gray code decoder 410 to generate decoded Gray data. Methods for detection of SAM data and decoding of Gray data are well known in the art. The 'Y' values are also applied to burst demodulator 411 to generate fine positioning information for the head over the track.

Operation of DC shift detector 405 is now described. Examination of analog waveforms representing servo data with DC shifts shows that the signal peaks present in a servo signal might be enhanced using an equalizer that provides gain or boost at higher frequencies above those corresponding to the DC shifts up to and beyond the Nyquist frequency. Thus, the corner frequency of the filter for CTF 402 might be set to the Nyquist frequency, providing Nyquist equalization. Nyquist equalization might degrade performance of receiver 400 with respect to SAM detection and Gray code decoding when only noise, and no DC shifts, are present as an impairment (i.e., when the head is in a "stable" state). The read head might transition from a stable state to a long period of instability, or unstable state, over multiple servo sectors before returning to the stable state.

Consequently, the presence of DC shifts are detected by DC shift detector 405, which generates a signal to change equalization of CTF 402 to Nyquist equalization during periods having DC shifts. Although a given implementation of DC shift detector might take approximately one servo sector processing time period to detect a DC shift and change equalization by equalizer 401, each subsequently processed sector benefits from the Nyquist equalization. Once DC shift detector 405 detects that a DC shift is no longer present, DC shift detector 405 generates a signal to switch equalization by equalizer 401 back to the original setting.

The first exemplary embodiment of FIG. 4 preferably employs a digital realization of DC shift detector 405, while other implementations might employ an analog DC shift detector instead. While additional analog circuitry is employed when the analog DC shift detector is used, an analog DC shift detector might allow for faster detection of DC shifts.

An implementation for DC shift detector 405 might employ one of a number of different methods known in the art. For example, one implementation observes a moving average output of ADC 404 and declares the presence of multiple DC shifts due to an unstable head when the moving average crosses a threshold. The moving average might be computed over a predetermined number W of samples, and the corresponding moving average filter (having filter length W) has W "1"s as its impulse response. The threshold might be optimized to minimize false DC shift detection based on a cost criterion. A related implementation for DC shift detector 405 might declare the absence or presence of DC shifts by observing the average output of ADC 404 over a servo sector. For the case where head instability is sporadic over a sector, but tends to repeat from sector to sector, DC shift detector 405 might declare the presence of DC shifts when the moving average output of ADC 404 crosses the threshold a given number of times during the sector. Similarly, the absence of DC shifts is declared when the moving average output does not cross the threshold during a sector. Yet another implementation for DC shift detector 405 might observe the absolute value of the output of ADC 404 over time to detect changes in baseline DC level.

Figure 5:
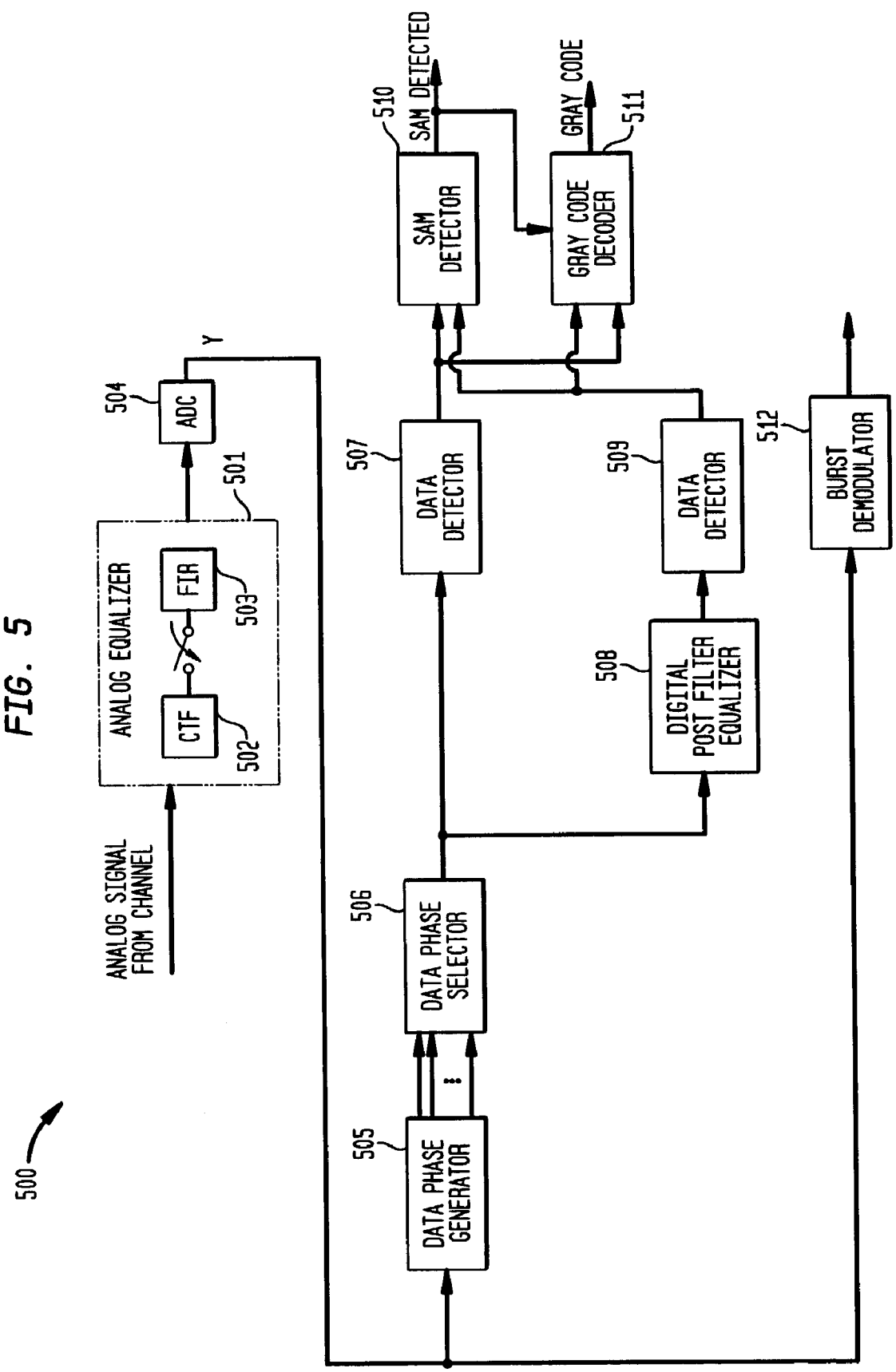
FIG. 5 shows a receiver for detecting and decoding data accounting for DC shift in accordance with a second exemplary embodiment of the present invention.

FIG. 5 shows a receiver 500 for detecting and decoding data accounting for DC shift in accordance with a second exemplary embodiment of the present invention. Receiver 500 comprises equalizer 501 having continuous time filter (CTF) 502 and finite impulse response filter 503, and analog to digital converter (ADC) 504. Receiver 500 further comprises burst demodulator 512, data phase generator 505, data phase selector 506, post filter equalizer 508, data detectors 507 and 509, SAM detector 510, and Gray code decoder 511.

Equalizer 501 and ADC 504 each operate in a similar manner to that of equalizer 401 and ADC 404, respectively, of FIG. 4, except that equalization of equalizer 501 is not switched to Nyquist equalization in the presence of DC shifts. In addition, data phase generator 505 and data phase selector 506 each operate in a similar manner to that of data phase generator 406 and data phase selector 407, respectively, of FIG. 4. Burst demodulator 512 receives unfiltered values from ADC 504.

The second exemplary embodiment differs from the first exemplary embodiment in that a DC shift detector is not employed; instead, post filter equalizer 508 is employed to post-process the sample sequence from data phase selector 506 for improved performance of SAM detector 510 and Gray code decoder 511. If the DC shifts occur with relatively great frequency, then more than a full servo sector might be required to detect the presence of DC shifts. The second exemplary embodiment corrects for effects of DC shifts by using a digital realization of either a finite impulse response (FIR) or an infinite impulse response (IIR) filter to post-process the sample sequence from data phase selector 506. The coefficients of digital post filter equalizer 508 might either be programmable or adaptively set based on an error criterion, such as minimum squared or absolute Euclidean distance. The filter coefficients of digital post filter equalizer 508 are in general set to boost high-frequency signal components near the Nyquist frequency in a manner similar to that described previously.

When no DC shifts are present, performance of SAM detector 510 and Gray code decoder 511 might not be as good if post filter equalizer 508 first processes a detected sample sequence. Consequently, the sample sequence from data phase selector 506 is provided to two paths. In one path, the sample sequence is simply provided to data detector 507, while in the other path the sample sequence is first processed by post filter equalizer 508 and then applied to data detector 509. Data detectors 507 and 509 each operate in a manner similar to that of data detector 408 of FIG. 4, and data detectors 507 and 509 may be equivalent. Alternatively, data detectors 507 and 509 may be optimized to account for whether or not the detector processes a sample sequence from post filter equalizer 508.

Figure 6:
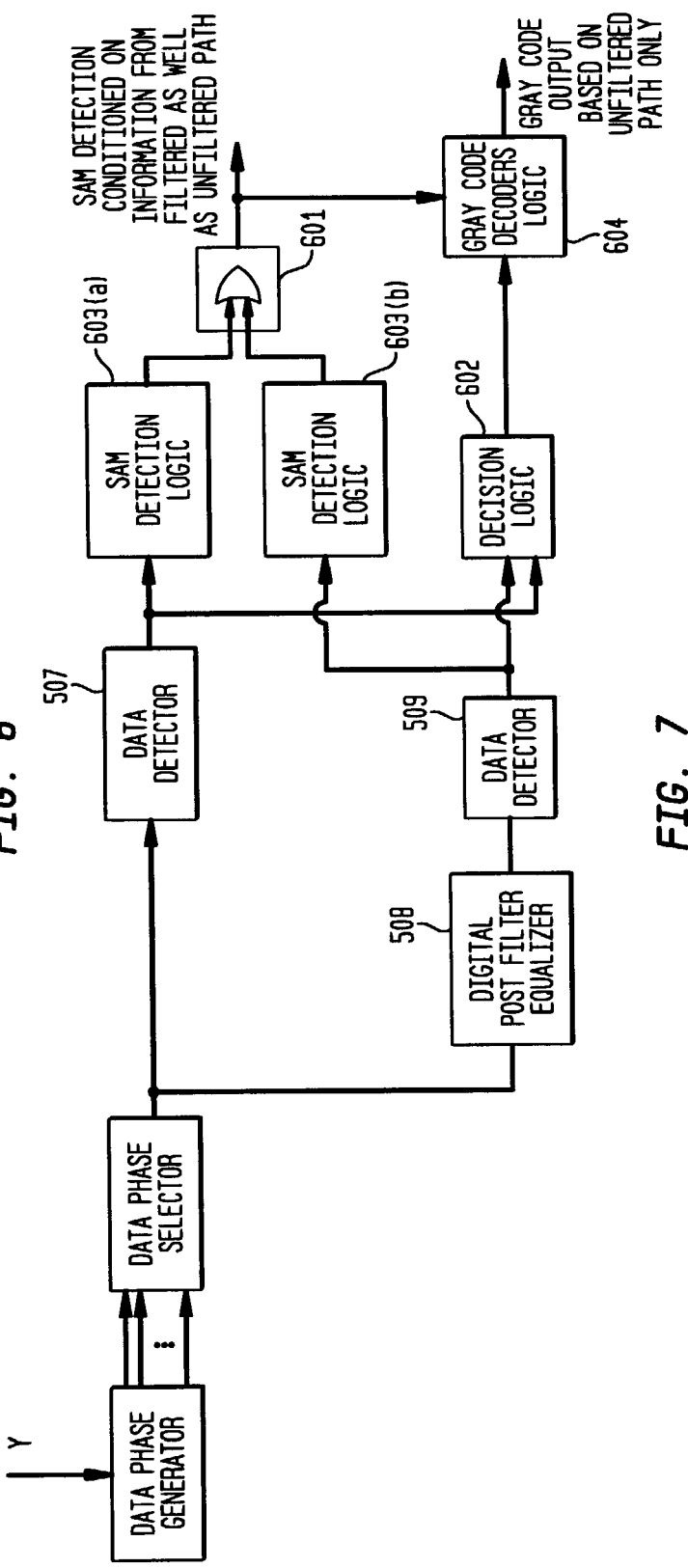
FIG. 6 shows an exemplary method of conditioning employed by the SAM detector and Gray code decoder of FIGS. 5.

FIG. 6 shows an exemplary configuration for conditioning employed by the SAM detector and Gray code decoder of FIG. 5. SAM detector 510 of FIG. 5 comprises conditioning logic 601 and SAM detection logic 603(a) and 603(b). SAM conditioning logic 601 generates a logic OR of the outputs of SAM detection logic 603(a) and (603(b). SAM detection logic 603(a) detects the SAM based on the unfiltered path output of data detector 507, while SAM detection logic 603(b) detects the SAM based on the filtered path output of data detector 509. In one implementation, Gray code decoder 511 includes Gray code decoding logic 604, which generates the Gray code output based on only the output of data detector 507 (the unfiltered, selected sample sequence). Conditioning logic 601 might be modified from the simple OR gate.

In another implementation, Gray code decoder 511 includes decision logic 602 in addition to Gray code decoding logic 604. Decision logic 602 might either i) combine the information from the two filtered and unfiltered path streams or ii) select one of the two streams from data detectors 507 and 509. Decision logic 602 of FIG. 6 might be configured to introduce a quality metric for use in selecting which bit to provide as input to Gray code decoding logic 604. One example of a quality metric might include a determination made for the outputs of the two data detectors (e.g., data detectors 507 and 509) that, for a given peak location corresponding to a particular bit, which data detector produced the larger peak.

Figure 7:
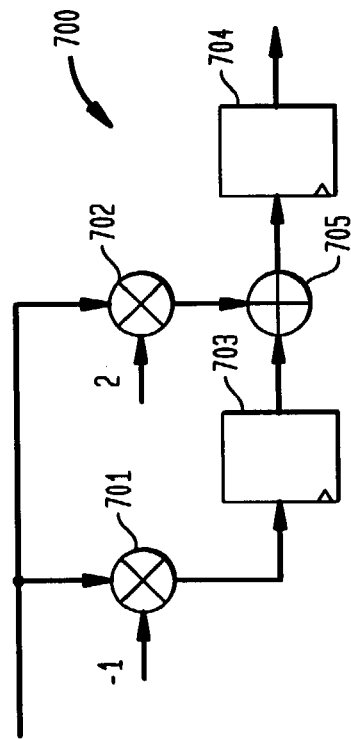
FIG. 7 shows an exemplary implementation of the digital post filter equalizer of FIGS. 5 and 6.

FIG. 7 shows an exemplary implementation 700 of digital post filter equalizer 508 of FIGS. 5 and 6. Post filter equalizer 700 is a (2-D) FIR filter ("D" stands for one sample discrete time delay) comprising multipliers 701 and 702, flip-flops 703 and 704, and adder 705. The current sample multiplied by coefficient (2) in multiplier 702 is added in adder 705 to the previous sample i) multiplied by −1 in multiplier 701 and ii) stored in flip-flop 703. The result from adder 705 is stored in flip-flop 704. As would be apparent to one skilled in the art, other filters may be employed for a post filter equalizer 508.

For the described second exemplary embodiment, the data phase update by data phase generator 505 and data phase selector 506 is performed based on the unfiltered sample stream from ADC 504 only. However, for some implementations, the data phase selection and update process might occur for the filtered path instead of the unfiltered path. Consequently, post filter equalizer 508 may be placed prior to data phase generator 505 and data phase selector 506 in the signal path.

While the present invention is described employing an EPR4 ([5 5 −5 −5]) target partial channel response, the present invention is not so limited. One skilled in the art may extend the teachings herein to different target partial channel responses. While the present invention is described for detection and decoding of encoded servo data from a magnetic recording medium, the present invention is not so limited. One skilled in the art may readily extend the teachings herein to sampled data read from other types of recording media, such as optical recording media.

A receiver employing one or more embodiments of the present invention may have substantially improved detection performance for readback data. Implementations of the one or more embodiments might exhibit such improved detection performance for readback data without degrading the detection performance of the servo demodulation data or the SAM and Gray data when no DC shifts are present to corrupt the servo signal. Such improved detection performance might improve the SAM detection and Gray bit error rate performance of a system in the presence of DC shifts by as much as an order of magnitude or more.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting data in a signal read from a channel, the apparatus comprising:
   a post-filter equalizer configured to apply equalization to the signal to account for a DC shift in the signal;
   a detector adapted to detect the data based on either the presence or absence of the DC shift in the signal; and
   a combiner adapted to combine i) the signal before applying the equalization and ii) the signal after applying the equalization into a combined signal; and
   a detector adapted to employ conditioned detection of the data based on the combined signal.

2. The invention as recited in claim 1, wherein the combiner is a logic OR.

3. The invention as recited in claim 1, wherein the data is servo data comprising servo address mark (SAM) data and Gray data, and wherein the detector detects the SAM data based on the combined signal.

4. The invention as recited in claim 3, wherein the apparatus further comprises a decoder adapted to decode the Gray data in the signal without applying the equalization based on the detected SAM data.

5. The invention as recited in claim 3, wherein the apparatus further comprises decision logic adapted to select either the i) the signal before applying the equalization and ii) the signal after applying the equalization for decoding the Gray data.

6. The invention as recited in claim 5, wherein the decision logic selects based on a detection metric.

7. The invention as recited in claim 1, wherein the post filter equalizer is a 2-D filter, where "D" is a unit discrete time delay.

8. The invention as recited in claim 1, further comprising:
   a DC shift detector adapted to detect the presence or absence of the DC shift in the signal and to generate a corresponding DC shift detect signal; and
   wherein the equalizer, in response to the DC shift detect signal, modifies the equalization based on the detected presence or absence of the DC shift in the signal.

9. The invention as recited in claim 1, wherein the apparatus is embodied in an integrated circuit (IC).

10. The invention as recited in claim 9, wherein the IC is implemented in a read channel component of either a magnetic recording system or an optical recording system.

11. A method of detecting data in a signal read from a channel comprising the steps of:
   (a) applying, with an equalizer, equalization to the signal to account for a DC shift in the signal; and
   (b) detecting the data based on either the presence or absence of the DC shift in the signal, wherein step (b) comprises the steps of:
     (b1) combining i) the signal before applying the equalization and ii) the signal after applying the equalization of step (a) into a combined signal; and
     (b2) conditioning detection of the data based on the combined signal.

12. The invention as recited in claim 11, wherein step (b1) comprises the step of logic ORing i) the signal before applying the equalization and ii) the signal after applying the equalization to generate the combined signal.

13. The invention as recited in claim 11, further comprising the step of (b3) detecting the data based on the combined signal.

14. The invention as recited in claim 13, wherein for, step (b3), the data is servo data comprising servo address mark (SAM) data and Gray data, and wherein step (b3) detects the SAM data based on the combined signal.

15. The invention as recited in claim 14, wherein step (b3) further includes the step of decoding the Gray data in the signal without equalization based on the detected SAM data.

16. The invention as recited in claim 13, further comprising the step of selecting either the i) the signal before applying the equalization and ii) the signal after applying the equalization for decoding the Gray data.

17. The invention as recited in claim 16, wherein either the i) the signal before applying the equalization and ii) the signal after applying the equalization is selected based on a detection metric.

18. The invention as recited in claim 11, wherein, for step (a), the equalization applied is a 2-D filter, where "D" is a unit discrete time delay.

19. The invention as recited in claim 11, wherein, for step (b), the data is servo data, and wherein step (b) further comprises the step of decoding the servo data.

20. The invention as recited in claim 19, wherein, for step (b), the servo data includes servo address mark (SAM) data and Gray data, and wherein step (b) includes the steps of detecting the SAM data and decoding the Gray data based on the detected SAM data.

21. The invention as recited in claim 11, wherein the method is embodied by a processor of an integrated circuit.

22. The invention as recited in claim 21, wherein the method is implemented by the processor in a read channel component of either a magnetic recording system or an optical recording system.

23. The invention as recited in claim 11, wherein step (a) comprises the steps of:
(a1) detecting the presence or absence of the DC shift in the signal; and
(a2) modifying the equalization based on the detected presence or absence of the DC shift in the signal.

24. A computer-readable medium having stored thereon a plurality of instructions, the plurality of instructions including instructions which, when executed by a processor, cause the processor to implement a method for detecting data in a signal read from a channel, the method comprising the steps of:
(a) applying, with an equalizer, equalization to the signal to account for a DC shift in the signal; and
(b) detecting the data based on either the presence or absence of the DC shift in the signal, wherein step (b) comprises the steps of:
(b1) combining i) the signal before applying the equalization arid ii) the signal after applying the equalization of step (a) into a combined signal; and
(b2) conditioning detection of the data based on the combined signal.

25. A method of detecting data in a signal read from a channel comprising the steps of:
(a) applying, with an equalizer, equalization to the signal to account for a DC shift in the signal; and
(b) detecting the data based on either the presence or absence of the DC shift in the signal, wherein:
the data is servo data that includes servo address mark (SAM) data and Gray data; and step (b) further comprises:
(b1) detecting the SAM data; and
(b2) decoding the Gray data based on the detected SAM data.

* * * * *

UNITED STATES PATENT AND TRADEMARK OFFICE
CERTIFICATE OF CORRECTION

PATENT NO.         : 7,231,001 B2
APPLICATION NO.    : 10/436527
DATED              : June 12, 2007
INVENTOR(S)        : Pervez M. Aziz Page 1 of 1

It is certified that error appears in the above-identified patent and that said Letters Patent is hereby corrected as shown below:

Column 10, line 18, replace "arid" with --and--.

Signed and Sealed this

Fourteenth Day of August, 2007

JON W. DUDAS
*Director of the United States Patent and Trademark Office*